(12) United States Patent
Dejong et al.

(10) Patent No.: US 12,093,699 B2
(45) Date of Patent: Sep. 17, 2024

(54) AUTOMATIC POPULATION OF BOOT VOLUMES VIA PROVIDED URLS

(71) Applicant: NVIDIA CORPORATION, Santa Clara, CA (US)

(72) Inventors: David Dejong, Fremont, CA (US); Siamak Nazari, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/802,878

(22) PCT Filed: Feb. 26, 2021

(86) PCT No.: PCT/US2021/020008
§ 371 (c)(1),
(2) Date: Aug. 26, 2022

(87) PCT Pub. No.: WO2021/174070
PCT Pub. Date: Sep. 2, 2021

(65) Prior Publication Data
US 2023/0093402 A1 Mar. 23, 2023

Related U.S. Application Data

(60) Provisional application No. 62/983,269, filed on Feb. 28, 2020.

(51) Int. Cl.
*G06F 15/177* (2006.01)
*G06F 9/00* (2018.01)
*G06F 9/4401* (2018.01)

(52) U.S. Cl.
CPC .......... *G06F 9/4408* (2013.01); *G06F 9/4416* (2013.01)

(58) Field of Classification Search
CPC ............................ G06F 9/4408; G06F 9/4416
See application file for complete search history.

(56) References Cited

U.S. PATENT DOCUMENTS

| | | | |
|---|---|---|---|
| 2007/0192466 A1 | 8/2007 | Nahum | |
| 2008/0155075 A1* | 6/2008 | Cromer | G06F 9/4416 709/222 |
| 2014/0282815 A1 | 9/2014 | Cockrell et al. | |
| 2014/0359263 A1* | 12/2014 | Belusar | G06F 9/4408 713/2 |
| 2016/0203000 A1 | 7/2016 | Parmar et al. | |
| 2016/0210161 A1* | 7/2016 | Rosset | G06F 9/4408 |
| 2017/0109176 A1* | 4/2017 | Shih | G06F 9/4406 |
| 2017/0308386 A1* | 10/2017 | Devitt-Carolan | G06F 9/4416 |
| 2020/0301616 A1* | 9/2020 | Ciocari | G06F 3/0664 |

* cited by examiner

*Primary Examiner* — Xuxing Chen
(74) *Attorney, Agent, or Firm* — HOGAN LOVELLS US LLP

(57) ABSTRACT

A storage system (400) includes a storage processor (420-1) such as a storage card resident in a host server (410-1) and coupled to the storage device (450-1). The storage processor (420-1) may be configured to create a virtual volume (428-1), store content derived from an image (492) downloaded from a URL storage corresponding to the virtual volume (428-1), and present the virtual volume (428-1) to the host server as a boot LUN. A management infrastructure (480) can be used to create a library (490) of images (492, 494) corresponding to different storage system characteristics and used to selected which URL is provided to the storage processor (420-1).

12 Claims, 3 Drawing Sheets

AUTOMATIC POPULATION OF BOOT VOLUMES VIA PROVIDED URLS

BACKGROUND

A boot volume refers to that storage volume, e.g., a portion of a hard drive, that contains an operating system for a computer system such as a server. In general, a computer system, when starting up or booting, needs to access and use the boot volume early in the process before many of the services needed for normal operation are ready. Today, servers can boot off of volumes provisioned on local drives, boot volumes provisioned on RAID cards, or boot volumes provision off of external storage (i.e., SANs, AFAs, NVMeoF, etc.).

Computer systems generally need to be set up and maintained with up-to-date software including an operating system provided on a boot volume, and servers providing storage services need to be set up with information regarding connected storage system and other servers that may be part of a combined storage platform. When setting up a new system including multiple servers, the system must be populated with correctly configured software so the servers can boot. Providing correctly configured software for a storage system, particularly a storage system employing multiple servers, can be a tedious process if the setup must be done by hand. For example, each new host server may need to be initially booted on a removable media or network provided image then either have software manually installed or copied.

BRIEF DESCRIPTION OF THE DRAWINGS

FIGS. 4-1 and 4-2 are block diagrams illustrating a storage platform in accordance with one example of the present disclosure providing one-touch server updates and installation.

The drawings illustrate examples for the purpose of explanation and are not of the invention itself. Use of the same reference symbols in different figures indicates similar or identical items.

DETAILED DESCRIPTION

In accordance with an aspect of the present disclosure, a network connected management infrastructure for a storage platform may provide an image to automatically populate one or more boot volumes in a storage platform. Accordingly, the image only needs to be configured once and can afterwards be applied to new host servers with minimal effort. This feature may apply an image without needing to separately boot a new host, saving time and manual effort.

In accordance with a further aspect of the present disclosure, cloud defined storage provides the ability to create and provision a boot volume of a server when provisioning storage the server provides. A cloud-based management infrastructure using a template sometimes referred to herein as a pod template can define the boot volumes that are created and populated as part of pod creation without any further actions from the user of the storage platform.

A storage platform may include a data plane provided by one or more host servers containing storage cards, sometime referred to as storage processing units (SPUs), that connect to and control storage devices. The storage platform may particularly employ multiple storage cards that operate cooperatively to provide storage services, and the storage cards that operate together are sometimes referred to herein as a pod. A pod of storage cards generally needs to be set up and initialized according to the requirements and desired characteristics of the storage platform and the available server and storage hardware. A pod is scalable and able to add practically any number or servers, storage cards, or storage devices as storage requirements of the storage platform change. Prior to initializing a storage card that will be a part of a storage platform, management infrastructure, which may provide a control plane for the storage platform, may select a template for the storage card. The selected template may, for example, be the same as a template previously used for a host server and storage card that are already in the pod that the new storage card is joining. Alternatively, if a new pod is being created, the template may be selected when a user, e.g., an representative of an enterprise using the storage platform, specifies the requirements or characteristics of the storage platform. A template may specify, for example, what size of boot volume should exist and may identify a Uniform Resource Locator (URL) for provisioning the boot volume. The URL may be preconfigured to return a bootable image, which may optionally be compressed. The (uncompressed) image may be of already set up software for a server hosting a storage card.

Figure 1:
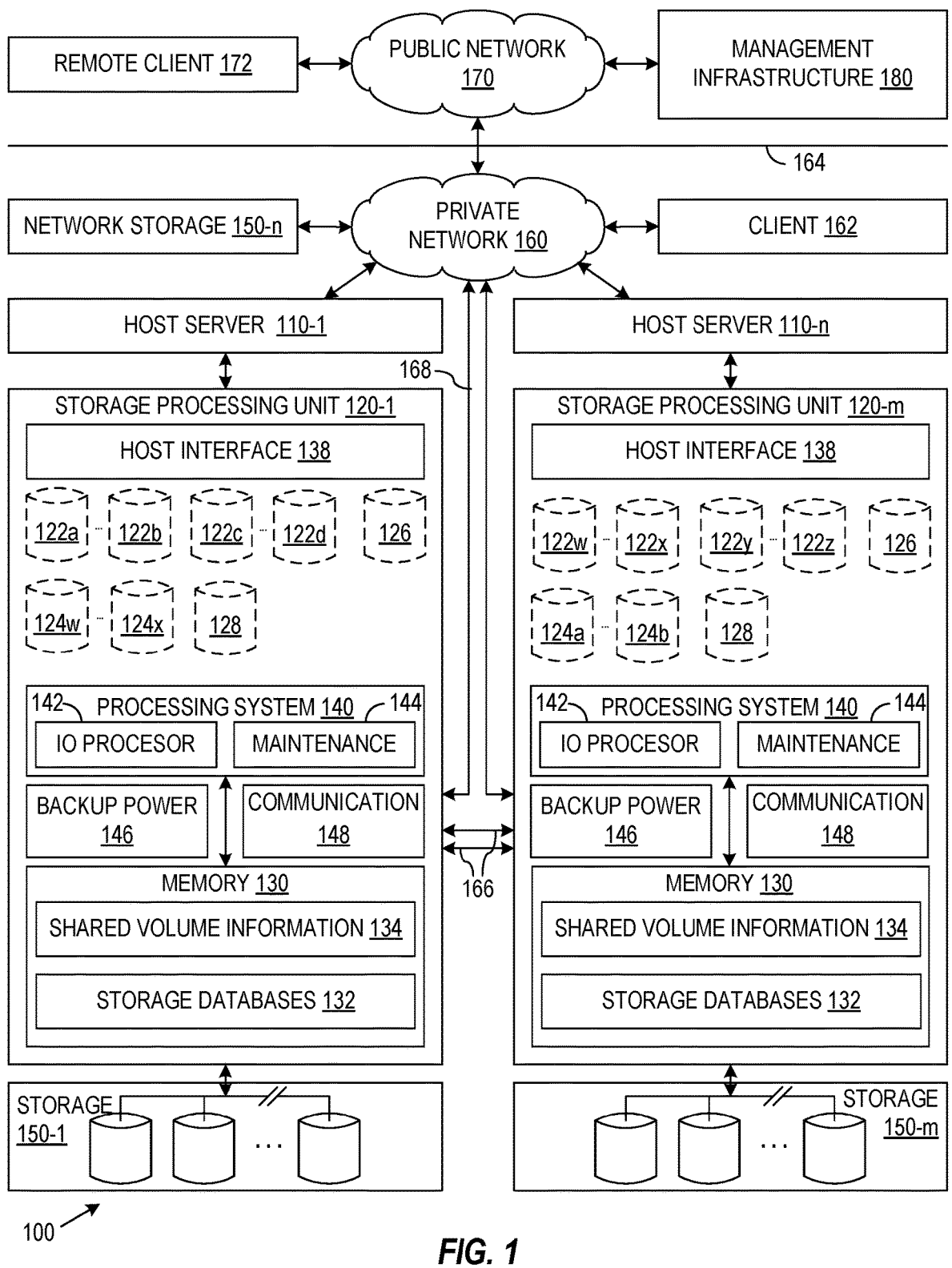
FIG. 1 is a block diagram illustrating an overall architecture including a storage platform in accordance with one example of the present disclosure.

FIG. 1 is a block diagram including a storage platform 100 in accordance with one example of the present disclosure. Storage platform 100 includes user hardware including one or more host servers 110-1 to 110-*n*, which are generically referred to herein as host server(s) 110. Each host server 110 may be a conventional computer or other computing system including a central processing unit (CPU), memory, and interfaces for connections to internal or external devices. One or more storage processing units (SPUs) 120-1 to 120-*m*, which are generically referred to herein as SPU(s) 120, are installed in host servers 110. In general, storage platform 100 may include one or more host servers 110, with each server 110 hosting one or more SPUs 120. A minimum configuration may include a single host server 110 in which one or more SPUs 120 resides. To improve redundancy, storage platform 100 may include at least two host servers 110 and at least at least two storage processing units 120 with attached backend storage, but more generally, a limitless number of different configurations are possible containing any number of host servers 110 and any number of SPUs 120. In general, storage platform 100 is scalable by adding more SPUs 120 with attached backend storage.

Each SPU 120 may provide storage services to the host servers 110 and clients 162 or 172 via virtual volumes or logical unit numbers (LUNs) 122. FIG. 1 particularly shows SPU 120-1 provides storage services relating to a set of virtual volumes 122*a* to 122*b* and 122*c* to 122*d*, and shows SPU 120-*m* provides storage services relating to virtual volumes 122*w* to 122*x* and 122*y* to 122*z*. SPU 120-1 is sometimes referred to as "owning" volumes 122*a* to 122*b* and 122*c* to 122*d* in that SPU 120-1 is normally responsible for fulfilling IO requests that are directed at any of volumes 122*a* to 122*b* and 122*c* to 122*d*. Similarly, SPU 120-*m* may be the owner of volumes 122-*w* to 122-*x* and 122*y* to 122*z* in that SPU 120-*m* is normally responsible for executing IO requests that are directed at any of volumes 122*y* to 122*z*. The virtual volumes, e.g., volumes 122*a* to 122*b*, 122*c* to 122*d*, 122*w* to 122*x*, and 122*y* to 122*z*, in FIG. 1 are generically referred to herein as virtual volume(s) 122. Each volume 122 may be a "mirrored" volume with each mirrored volume having a backup volume 124 kept somewhere in storage platform 100. In FIG. 1, SPU 120-1 maintains backup volumes 124*w* to 124*x* that copy mirrored volumes 122*w* to 122*x* that SPU 120-*m* owns, and SPU 120-*m* maintains backup volumes 124*a* to 124*b* that copy virtual volumes 122*a* to 122*b* that SPU 120-1 owns. One or more backup volumes 124*a* to 122*b* and 124*w* to 124*x* of FIG. 1 are generically referred to herein as backup volume(s) 124. As described further below, backup volumes 124 may be virtual volumes that are copies of respective primary volumes 122. Volumes 122*c* to 122*d* and 122*y* to 122*z* are "unmirrored," meaning volumes 122*c* to 122*d* and 122*y* to 122*z* do not have associated backup volumes.

SPUs 120 may also maintain snapshots 126 of one or more volumes 122 or backup volumes 124 and may provide volumes 128 that are not available for shared data storage. Each snapshot 126 corresponds to data of a volume 122 or 124 at a time corresponding to the snapshot 126. Volumes 128 may include volumes that are only used by the host server 110, e.g., boot LUNs as described further below.

Each SPU 120 controls backend storage 150, e.g., storage 150-1 to 150-*m*, for storage of data corresponding to virtual volumes 122 that the SPU 120 owns and for backup volumes 124, snapshots 128 and unshared volume 128 that the SPU 120 maintains. In the example of FIG. 1, SPUs 120-1 operates storage 150-1 to store the data associated with primary volumes 122*a* to 122*b* and 122*c* to 122*d*, backup volumes 124*w* to 124*x*, and any snapshots 126 or unshared volumes 128. SPUs 120-*m* operates storage 150-*m* to store the data associated with primary volumes 122*w* to 122*x* and 122*y* to 122*z*, backup volumes 124*a* to 124*b*, and any snapshots 126 or unshared volumes 128. Storage 150 may be installed in the same host server 110 as an associated SPU 120, include one or more external storage devices directly connected to its associated SPU 120 or host 110, or include network-connected storage 150-*n*. Storage 150 may employ, for example, hard disk drives, solid state drives, or other nonvolatile storage devices or media in which data may be physically stored, and storage 150 particularly may have a redundant array of independent disks (RAID) 5 or 6 configuration for performance and redundancy.

Each SPU 120 may be installed and fully resident in the chassis of its associated host server 110. Each SPU 120 may, for example, be implemented with a card, e.g., a PCI-e card, or printed circuit board with a connector or contacts that plug into a slot in a standard peripheral interface, e.g., a PCI bus in host server 110. Each SPU 120 may further be or include a device (e.g., a circuit board, multiple circuit boards, a SoC, or an ASIC). In particular, each SPU 120 may connect to its host server 110 through an IO interconnect, which could be PCI-e bus, QuickPath interconnect (QPI) or equivalent front-side bus, or Gen-Z bus. FIG. 1 shows an example implementation of the present disclosure in which each SPU 120 includes a host interface 138 that is adapted or configured for connection to a host server 110. Host interfaces 138 are normally under the host's power, control and/or enumerations, but other core functions of SPUs 120, e.g., memory 130, processing system 140, and communication module 148, may be isolated from host servers 110 and connected to a backup power unit 146 that provides backup power to continue at least some operations of the SPU 120 regardless of state of its host 110, e.g., across host firmware upgrades, reset, and reboots of host servers 110. The isolated core functions of an SPU 120 may be implemented as an add-in card, mezzanine card, or a built-in mobile board (MB) device. A mezzanine card, also known as a "daughterboard," may be a VMEbus card, a CompactPCI card or a PCI card plugged into a board forming or including other portions of SPU 120.

Each SPU 120 includes memory 130 and a processing system 140 that may be parts of the isolated core of the SPU 120 and that are configured and used to provide the IO services of the SPU 120. As described further below, processing system 140 may include one or more processors to execute software or firmware to implement an IO processor 142 and a maintenance module 144. IO processor 142 may be used to process 110 requests such as reads and writes to primary volumes 122 owed by the SPU 120. In particular, IO processor 142 may perform single pass storage processing including, for example, hash calculations for deduplication, compression, encryption in single pass automatically on data coming into SPU 120. Maintenance module 144 may perform operations such as garbage collection to ensure that the associated physical storage 150 and other resources of the SPU 120 are efficiently used and maintained. During normal operation of each SPU 120, memory 130 and a processing system 140 may use power that the associated host server 110 provides and could use server-provided cooling, but in the event a host failure, memory 130 and a processing system 140 may receive power from its backup power unit 146 to operate SPU 120 for a period of time when its host server 110 is not providing power, e.g., after the host server 110 loses power or otherwise powers down. In particular, processing system 140 continues to operate and execute firmware, and memory 130, which may contain or operate nonvolatile storage, such as non-volatile dual inline memory modules (NVDIMMs), phase change memory (PCM), or high endurance flash storage devices, remains accessible to processing system 140 for at least some period of time after the host server 110 powers down. Backup power unit 146 may further provide power to a communication module 148 to enable processing system 140 to communicate with other SPUs 120 and/or other devices using network communications. As described further below, an SPU 120 may thus execute a limited-power process or a safe power down process when its host unexpectedly power cycles or powers down.

Multiple SPUs 120, e.g., SPU 120-1 to 120-*m* in FIG. 1, may be connected together using high speed data links 166, e.g., one or more parallel 25 GB/s Ethernet links, to form a data network for a pod of SPUs 120. Data links 166 may particularly form a high speed data network that directly connects the SPUs 120 in a pod and that is independent of a private network 160 connecting host servers 110 and clients 162.

Each SPU 120 may further employ a link 168 to connect to the local, private network 160 and through local network 160 and a firewall 164 connect to a public or wide area network 170, e.g., the Internet. In some implementations of storage platform 100, client stations 162 may communicate through a host 110 or through a link 168 to request storage services from an SPU 120. Each client station 162 may be a computer including a processor, memory, and software or firmware for executing a user interface adapted to communicate over local network 160. Client stations 162 in general may be storage clients that require storage services that storage platform 100 provides. FIG. 1 further shows that local network 160 may provide a connection through firewall 164 to network 170, e.g., the Internet, so that SPUs 120 may be remotely accessed, for example, by a cloud-based management infrastructure 180, which is described further below. Additionally, some clients 172, which may also be storage clients, may connect through public network 170 to receive storage services from storage platform 100.

Cloud-based management infrastructure 180 may include a computer or server that is remotely located, e.g., to reduce the burden of storage management on an enterprise operating storage platform 100 or to allow storage management by experts such as manufacturers of the SPUs 120. Management infrastructure 180 may be used to manage SPUs 120, e.g., to configure SPUs 120, monitor performance of storage platform 100, or provide analysis services. In particular, management infrastructure 180 may configure each SPU 120 to create virtual volumes 122 that the SPU 120 owns or populate the content of volumes 128, e.g., boot volumes.

Figure 2:
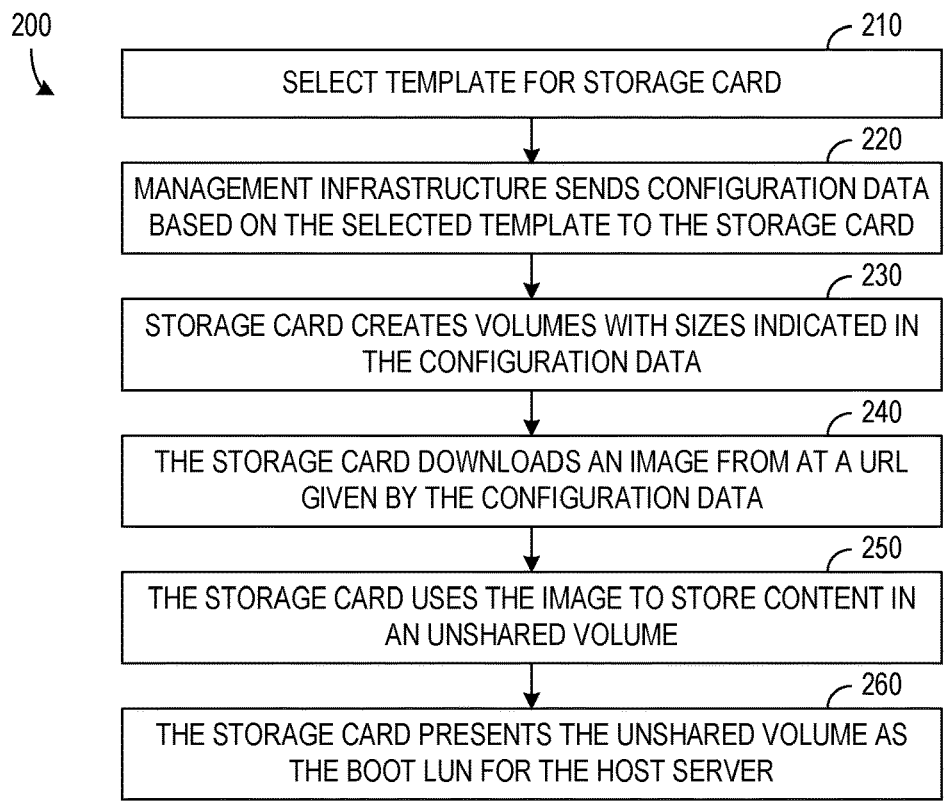
FIG. 2 is a flow diagram of a process in accordance with an example of the present disclosure for initializing a storage processing unit and associated storage and particularly providing a server with a boot volume.

FIG. 2 is a flow diagram of a process 200 for initializing a storage card, e.g., one of the SPUs 120 in storage platform 100 of FIG. 1. In a process block 210, a template is selected for a storage card. The template may be selected and constructed based on the available hardware, e.g., the host and the backend storage device connected to the storage card, and on the storage needs of the enterprise operating the storage platform that will include the storage card. When a storage card is initialized, the management system, e.g., cloud-based management infrastructure 180 of FIG. 1, in a process block 220, sends to the storage card configuration data or instructions that are based on the selected template. The storage cards, as described above, may have communication interfaces capable of receiving the configuration data whether or not the host has fully booted. Based on the configuration data or instructions, the storage card in process block 230 creates volumes having sizes specified by the configuration data or instructions. The created volumes may include primary storage volumes, e.g., volumes 122, and a boot LUN, e.g., an unshared volume 128 that the host server 110 will use as a boot volume.

The storage card, in a process block 240, attempts download content for the boot LUN. For example, configuration data send during process block 220 may provide the storage card with a URL that links to an image of the desired contents of the boot LUN, and the storage card attempts to connect to the given URL and download the image. Process block 240 may include the storage card reading a reported size for the content and returning an error if the reported size exceeds the volume size of the boot LUN. If the content size and volume size match, the storage card continues the download. The download may be performed as a background task, and the storage card may proceed with other operations such as creating further volumes, e.g., volumes 122, for data storage while the image is being downloaded. The storage card, in process block 250 uses the downloaded image to fill the boot LUN with content. In particular, if the storage card detects that the retrieved data is compressed with a recognized algorithm, such as gzip, bzip2, or xz, the storage card decompresses the data before writing the decompressed data to the boot volume. When the download is complete and the boot LUN contains the content identified by the template, the storage card may present the volume as SCSI LUN 0, allowing the host server of the card to boot from the volume.

Figure 3:
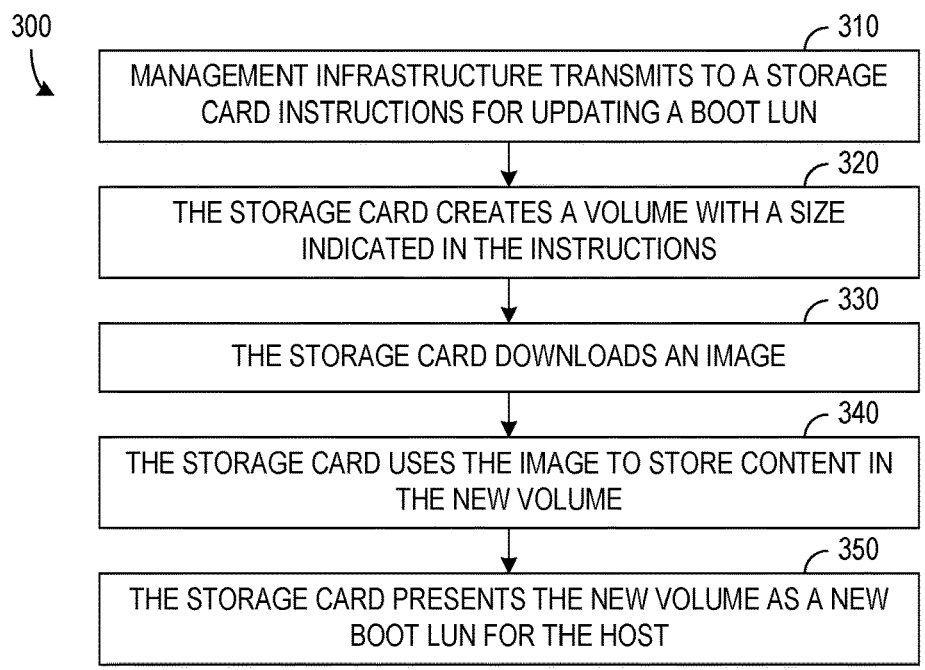
FIG. 3 is a flow diagram of a process for updating or replacing a boot volume in a storage platform in accordance with an example of the present disclosure.

A similar process may allow management infrastructure and storage cards to replace or update the boot volumes of existing virtual machines. FIG. 3, for example, is a flow diagram of a process 300 for updating a boot LUN. In a process block 310, the management infrastructure, which determines an update is needed, instructs a storage card to create a new volume and gives the storage card a URL to a new image. The storage card in process block 320 creates a volume with the size indicated in the instructions and in process block 330 downloads the new image from the provided URL. In a process block 340, the storage card decompresses the image (if necessary) or otherwise uses the image to provide the content that the storage card stores onto the new volume. Once the new volume is ready, the storage card, in process block 350, presents the new volume as the boot LUN for the host, thus automatically replacing the prior boot LUN by pointing at the new volume when a host reboot is detected.

Figures 1, 4:
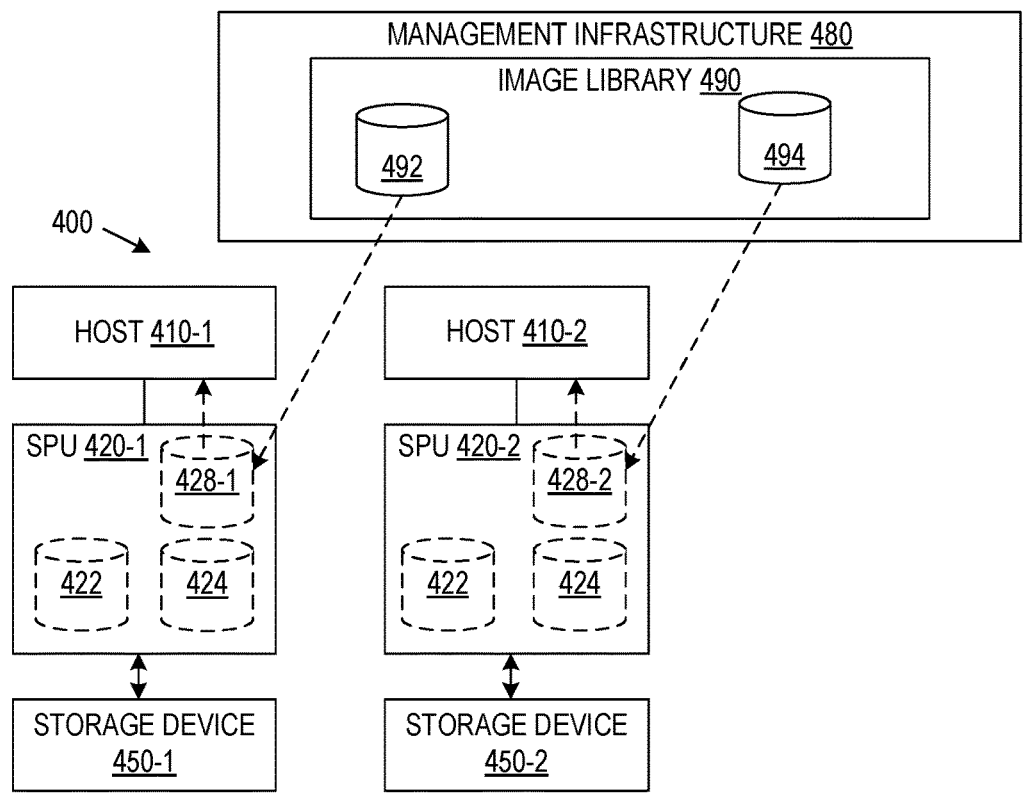
Figures 2, 4:
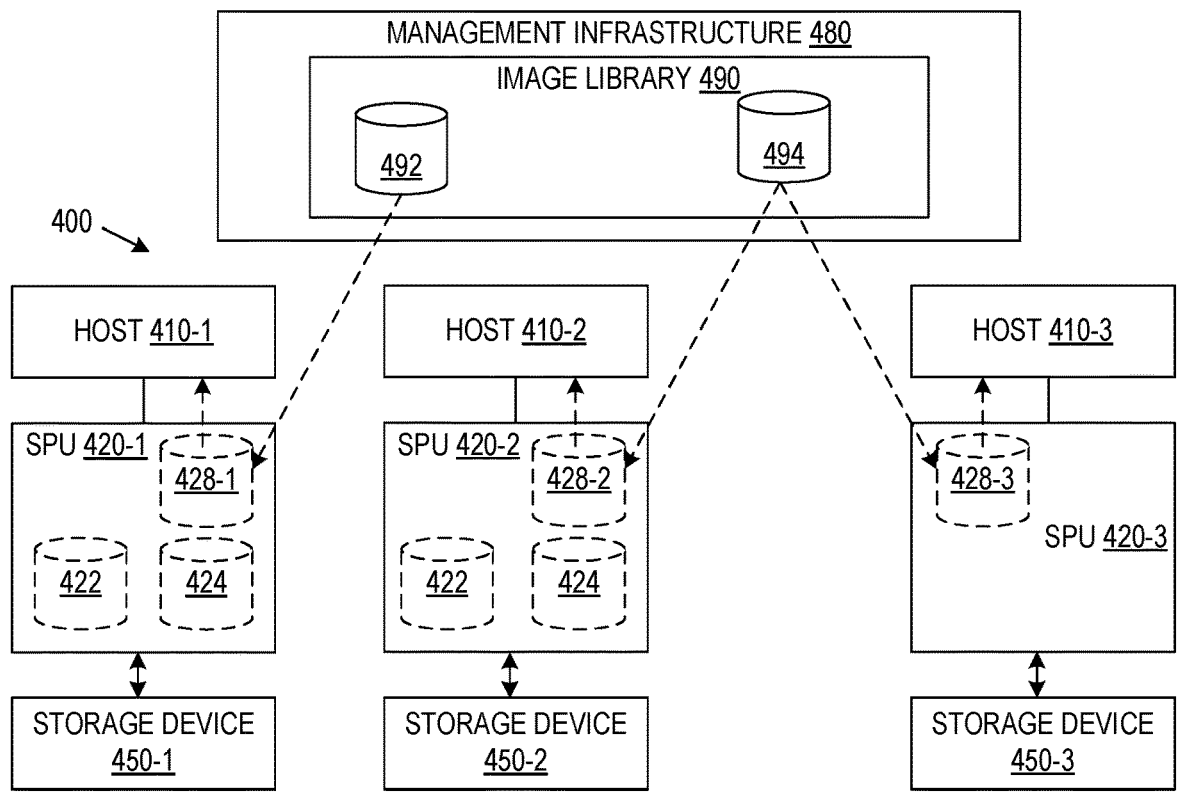

FIG. 4-1 illustrates a storage platform 400 that may employ cloud-based configuration or update processes as described above. As an example, storage platform 400 initially has a data plane provided by a pod including two hosts 410-1 and 410-2 respectively containing SPUs 420-1 and 420-2 with respective backend storage 450-1 and 450-2. In one implementation, hosts 410-1 and 410-2, SPUs 420-1 and 420-2, and backend storage devices 450-1 and 450-2 may be similar or identical to the host servers 110, SPUs 120, and storage devices 150 described above with reference to FIG. 1. Each SPU 420-1 or 420-2 owns zero, one, or multiple shared or unshared virtual volumes 422 and maintains zero, one, or multiple shared backup virtual volumes 424. SPUs 420-1 and 420-2 also provide virtual volumes 428-1 and 428-2 that are configured as boot LUNs respectively for hosts 410-1 and 410-2. In particular, host 410-1 is able to use volume 428-1 as a boot drive. Similarly, host 410-2 is able to use volume 428-2 as a boot drive. Boot LUNs 428-1 and 428-2 generally do not require or have a backup volume, and boot LUNs 428-1 and 428-2 do not need to be (and generally are) not shared. In particular, boot LUNs 428-1 and 428-2 may be volumes that are accessible only from respective SPUs 420-1 and 420-2 by respective hosts 410-1 and 410-1.

FIG. 4-1 further illustrates management infrastructure 480 which includes a computer system storing an image library 490. In one implementation, management infrastructure 480 may be a remote system similar or identical to cloud-based management infrastructure 180 of FIG. 1 and may communicate with storage platform 400 through a network including the Internet. Alternatively, management infrastructure 480 may be directly connected to the local or private network (not shown) also connected to SPUs 420-1 and 420-2. Image library 490 in management infrastructure 480 contains boot LUN images 492 and 494 that may be identified by and accessible using respective URLs. One feature of storage platform 400, a manager or other user of management infrastructure 480 can create a boot LUN image 492 or 494 and direct SPUs, e.g. SPU 420-1 and 420-2, populate their owned boot LUNs, e.g., boot LUNs 428-1 and 428-2, from specified images 492 or 494. For example, SPUs for all hosts running a specific operating system, e.g., a specific version of Linux or Microsoft Windows®, may be directed to pre-populate their boot LUNs by copying from image library 490 the image corresponding to the specific operating system used by their hosts. In the implementation of FIG. 4-1, SPU 420-1 may copy image 492, which may be for hosts running a particular version of Microsoft Windows®, to boot LUN 428-1, and SPU 420-2 may copy image 494, which may be for hosts running particular version of Linux, to boot LUN 428-2. Only host 410-1, which is connected to SPU 420-1, sees or uses volume 428-1 as a boot volume. Similarly, SPU 420-2 pre-populates boot LUN 428-2 with image 494, and only host 410-2, which connects to SPU 420-2, see or uses volume 428-2.

Storage platform 400 is further scalable and may be increased in storage capacity by adding another host server, and FIG. 4-2 shows storage platform 400 after addition of a new host server 410-3 containing an SPU 420-3 connected to a storage device 450-3. When SPU 420-3 is added to the pod including SPUs 420-1 and 420-2, host server 410-3 needs software including an operating system that is appropriate for the functions of host 410-3. To add host 410-3 and SPU 420-3 to the pod, management infrastructure 480 may provide SPU 420-3 with the URL for image 494, which was already configured for an SPU and host in the pod, i.e., for SPU 420-2 and host 410-2. At an initial startup of SPU 420-3, SPU 420-3 downloads image 494 from the provided URL, decompresses the data if necessary, and creates a boot LUN 428-3. Once boot LUN 428-3 is ready, host server 410-3 can boot from LUN 423-3 so that host 410-3 and SPU-3 are configured to operate as part of storage platform 400 and in particular so that new volumes that SPU 420-3 may be made available for storage services.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A storage system comprising:
    a storage device; and
    a storage processor unit (SPU) resident in a host server and distinct from a central processing unit (CPU) of the host server, the SPU connected to the storage device, the SPU comprising a network interface and being configured to access a Uniform Resource Locator (URL), wherein the SPU is further configured to:
    create a virtual volume which is accessible to the host server only through the SPU;
    download an image from the URL;
    store in the storage device content derived from the image, the content being written onto the virtual volume; and
    present the virtual volume to the host server as a boot logical unit number (LUN) for the host server.

2. The system of claim 1, wherein the network interface access the URL through the Internet.

3. The storage system of claim 1, wherein a management infrastructure creates the image at the URL.

4. The storage system of claim 3, wherein the management infrastructure communicates configuration instructions to the SPU through the network interface of the SPU, the configuration instructions including the URL.

5. The storage system of claim 4, wherein the management infrastructure selects from among a plurality of URLs, the URL as corresponding to an operating system that the host runs, the plurality of URLs correspond to a plurality of different operating systems.

6. The storage system of claim 4, wherein the management infrastructure selects the URL based on a template selected for a storage platform including the storage system.

7. A method comprising:
    operating a storage processor unit (SPU) that is resident in a host server which also comprises a central processing unit (CPU), the SPU connected to a storage device and to perform a first process including:
    receiving a Uniform Resource Locator (URL);
    creating a virtual volume, which is accessible to the host server only through the SPU;
    downloading an image from the URL;
    storing in a storage device connected content derived from the image, the content being written onto the virtual volume; and
    presenting the virtual volume to the host server as a boot logical unit number (LUN) for the host server.

8. The method of claim 7, further comprising a management infrastructure that is remote from the host server performing a second process including:
    selecting the URL for the SPU;
    communicating the URL to the SPU; and
    maintaining the image at the URL.

9. The process of claim 8, wherein the selecting the URL comprises from selecting from among a plurality of URLs that are respectively associated with a plurality of images that the management infrastructure maintains.

10. The process of claim 9, wherein the plurality of images includes images respectively for different operating system.

11. The process of claim 9, wherein the plurality of images includes images associated with different storage templates.

12. The process of claim 11, further comprising selecting a storage template based on characteristics of a storage platform including the SPU, wherein the URL selected is associated with the storage template selected.

* * * * *